United States Patent
Smart et al.

[11] Patent Number: 5,834,316
[45] Date of Patent: Nov. 10, 1998

[54] SOLVENT EXTRACTION

[75] Inventors: Neil Graham Smart; Robert George Godfrey Holmes; Nigel Dennis Tinker; Michael Darbyshire, all of Preston, United Kingdom

[73] Assignee: British Nuclear Fuels plc, Risley, Warrington, Chesire, United Kingdom

[21] Appl. No.: 571,845
[22] PCT Filed: Apr. 20, 1995
[86] PCT No.: PCT/GB95/00892
 § 371 Date: Apr. 25, 1996
 § 102(e) Date: Apr. 25, 1996
[87] PCT Pub. No.: WO95/29000
 PCT Pub. Date: Nov. 2, 1995

[30] Foreign Application Priority Data

Apr. 21, 1994 [GB] United Kingdom .................. 9407920

[51] Int. Cl.$^6$ .................................................. G01N 1/18
[52] U.S. Cl. .................... 436/178; 210/551; 210/634; 210/638; 210/639; 436/73; 436/75; 436/79; 436/81; 436/82; 436/83; 436/84; 436/103; 436/119; 436/161
[58] Field of Search ................ 436/73, 75, 79, 436/81, 82, 83, 84, 103, 119, 177, 178, 161; 210/634, 639, 511

[56] References Cited

U.S. PATENT DOCUMENTS

| | | | |
|---|---|---|---|
| 4,518,484 | 5/1985 | Mann et al. ............................. | 208/87 |
| 5,225,173 | 7/1993 | Wai ........................................... | 423/2 |
| 5,356,538 | 10/1994 | Wai et al. ................................ | 210/634 |
| 5,641,887 | 6/1997 | Beckman et al. ...................... | 546/26.2 |

OTHER PUBLICATIONS

Webster's Ninth New Collegiate Dictionary, Merriam–Webster Inc. (1987) p. 690.
Field et al., Anal Chem. vol. 64, pp. 3161–3167 (1992).
Wang et al., The Analyst vol 121, pp. 817–823 (1996).
Chemical Abstracts, CA 120 : 309472, Lin et al., Environ. Sci. Technol. vol. 28, No. 6, pp. 1190–1193 (1994).
Chemical Abstracts, CA 121 : 19390, Lin et al., Anal. Chem. vol. 66, No 13 pp. 1971–1975 (1994).
Chemical Abstracts, CA 121 : 72 511, Wang et al., Anal. Chem. vol. 66, No. 10 pp. 1658–1663 (1994).
CA 125 : 131032 Wang et al., Analyst (Cambridge UK) (1996), 121(6), pp. 817–823.
CA 124 : 163745 de Castro et al., Trends Anal. Chem. (1996), 15(1), p.32–37.
CA 123 : 40036 Bowadt et al., J. Chromatogr. A (1995), 703(1&2) pp. 549–571.
CA 122 : 305495 Lin et al., Trends Anal. Chem. (1995), 14(3) pp. 123–132.

*Primary Examiner*—Jan Ludlow
*Attorney, Agent, or Firm*—Sheridan Ross P.C.

[57] ABSTRACT

A method of extracting anionic species from a solid or liquid medium by contacting the medium with an extract solvent of supercritical carbon dioxide and a positively charged complexant ligand for solubilizing and extracting the anionic species form the medium.

18 Claims, 1 Drawing Sheet

SOLVENT EXTRACTION

FIELD OF THE INVENTION

The present invention relates to the solvent extraction.

BACKGROUND OF THE INVENTION

Solvent extraction is used in a variety of analytical and industrial applications particularly in the chemical engineering and waste treatment fields. For example, hazardous radioactive and non-radioactive species present in a solid or liquid medium may be extracted into a solvent system and subsequently isolated and disposed of or recycled as appropriate.

A known technique which has been used for solvent extraction of metal containing species is supercritical fluid extraction (SFE). This technique is reported in a number of papers for example:

Hawthorne, S B Anal. Chem. 1990, 62, 633A;

Fahmy, T M; Paulaitis, M E; Johnson, D M; McNally, M E P Anal. Chem. 1963, 65, 1462;

Lin, Yuehe; Brauer, R D; Laintz, K E; Wai, C M Anal. Chem. 1993, 65, 2549; and

Hedrick, J L; Mulcahey, L J Taylor L T, In "Supercritical Fluid Technology—Theoretical and Applied Approaches to Analytical Chemistry", Bright F V and McNally M E, Eds.; ACS Symposium Series 488; Amer. Chem. Soc., Washington, D.C., 1991, p 206–220. In SFE the extractant solvent comprises a supercritical fluid such as carbon dioxide together with a complexant or chelant which serves to dissolve the metal species by forming a soluble complex. In the SFE processes described in the prior art the complexant provides a negatively charged ligand to facilitate metal ion extraction.

SUMMARY OF THE INVENTION

According to the present invention there is provided a method of extracting ionic species from a host medium containing such species which comprises contacting the medium with an extractant solvent which comprises a supercritical fluid and a complexant for solubilising and extracting the ionic species present in the said medium wherein the complexant comprises a positively charged ligand.

The method according to the present invention may therefore be employed to extract anions from a host medium containing such species.

The extractant solvent may also include a conditioning agent which may comprise an oxidising agent or a reducing agent and is present to assist dissolution of the metal species in the complexant by changing the oxidation state thereof. The presence of the conditioning agent thereby beneficially increases the efficiency of the solvent system in dissolving the anions to be extracted.

Where the conditioning agent is an oxidising agent it may be selected from a peroxide such as $H_2O_2$, a perchlorate such as $NaClO_3$, oxygen, ozone and potassium permanganate or a plurality of oxidising agents.

Where the conditioning agent is a reducing agent it may be selected from hydrogen, hydrazine or a solution containing an oxidisable metal species such as $Fe^{++}$ or $Cu^+$, or a plurality of reducing agents.

The medium from which anions are desired to be removed by the method according to the present invention may be a solid or liquid medium. Where the medium is a solid it may comprise a particulate material such as soil, sludge, an industrial process residue, an industrial process slag or the like. The metal species may be contained on the surface of the particles and/or bound within the particles. The medium could alternatively be a material to be decontaminated, e.g., a metal or concrete structure, waste building materials such as rubble or contaminated waste materials such as rubber, plastics or textiles materials. Where the medium is a liquid it may for example comprise a process solvent or an industrial effluent stream.

The method of the present invention may for example be employed to analyse the concentration of anion species of interest in liquid or solid samples. For example, when analysing for the presence of anion contaminants it may be desirable to produce a stock solution which is subsequently divided into multiple samples for different analyses.

The present invention may alternatively be employed to decontaminate surfaces contaminated with radioactive or non-radioactive anion species.

The present invention may for instance be employed for soil clean-up for land remediation purposes.

The present invention may alternatively be employed in processes which employ conventional solvent extraction, e.g., dissolution of lanthanide- or actinide-containing anions produced in reprocessing of irradiated nuclear fuel or dissolution of uranium in the refinement treatment of uranium ores.

The positively charged ligand of the complexant may comprise an organic nitrogen compound, for example an aliphatic derivative of ammonia. The complexant may for example comprise tert-butyl ammonia. One or more other positive or neutral ligands may be employed with the same complexant to enhance extractant solvent efficiency. For example, the extractant solvent may comprise tert-butyl ammonia and an organic phosphate, eg tri-butyl phosphate.

The anion species to be extracted by the method of the present invention may in general terms comprise radioactive or non-radioactive species which may include:

(i) anions of actinides or their radioactive decay products or compounds thereof;

(ii) anions of fission products;

(iii) anions of heavy metals or compounds thereof;

(iv) other common anions such as halides, phosphates and sulphates.

Actinides are elements having periodic numbers in the inclusive range 89 to 104.

The term 'fission product' as used herein refers to those elements formed as direct products (or so-called 'fission fragments') in the fission of nuclear fuel and products formed from such direct products by beta decay. Fission products include elements in the range from selenium to cerium including elements such as $_{56}Ba$, $_{40}Zr$ and $_{52}Te$ $_{55}Cs$ and $_{58}Ce$.

The metal species producing anions to be extracted by the present invention may alternatively comprise non-radioactive heavy metal species. Non-radioactive heavy metal containing anions desired to be separated by the method of the present invention include toxic metals such as cobalt, chromium, lead, cadmium and mercury which are commonly found as earth contaminants near industrial plants and on waste disposal sites and in aquatic sediments employing chemicals containing those elements and may form anions in conjunction with other substances present in the earth.

The anions extracted by the method of the present invention may comprise one or more of the following: $F^-$, $Cl^-$, $Br^-$, $I^-$, $SO_4^{--}$, $PO_4^{---}$, $CrO_4^{--}$, $Cr_2O_7^{--}$, $MnO_4^-$, $U_2O_7^{--}$, $TcO_4^-$ and $V_2O_5^{--}$.

The complexant employed in the method according to the present invention is selected according to the anion species to be extracted. Desirably, the complexant has high volatility and has a significant change in solubility in the supercritical fluid with temperature. This allows the complexes to be formed to be separated from the solvent by known processes such as precipitation.

In the method according to the present invention the composition comprising the solvent mixture may include in the following relative proportions:

(a) supercritical fluid, from 99.99 to 80 per cent by volume;
(b) complexant, from 0.01 to 10 per cent by volume;
(c) conditioning agent, from 0 to 10 per cent by volume.

Further optional additives may be included in the extractant solvent. For example, minor aqueous additives such as water (up to 10 per cent by volume) and minor organic additives such as ethanol may be included in the solvent up to 10 per cent by volume.

In the method according to the present invention the complexant and the conditioning agent may each be added to the supercritical fluid at any time prior to or during contacting of the medium containing the anion species to be extracted. For example, complexant and conditioning agent may be separately formed into an extractant mixture and then added to supercritical fluid in an extractant vessel and the extractant solvent so formed may be passed along a tube or pipe under pressure to a contactor in which the medium to be treated is contacted. The solution containing the extracted anions may be further transported to an extractor in which the anion species are separated from the solution by precipitation. The extractor may for example comprise a collector vessel having associated means for changing the pressure and/or temperature of the supercritical fluid-containing solution whereby the complex containing the anion species therein are precipitated. The collector vessel may contain an organic solvent eg chloroform. The precipitate may subsequently be separated in a known way e.g., by filtration, centrifugation, flocculation or by use of a hydro-cyclone or other known means. If the collector vessel contains an organic solvent, separation from this solvent may be achieved by evaporation.

Where actinides or other hazardous material are separated in this way they may thereby be obtained in highly concentrated form. If desired, particular actinides such as plutonium can be further separated from the other separated species in a known way e.g., as conventionally employed in irradiated nuclear fuel reprocessing methods. Compounds of high activity level radioactive elements separated may be encapsulated in a known way eg by a known vitrification process. In any event, all procedures for handling concentrated plutonium and other hazardous elements are carried out by remote operations in radiation shielded enclosures.

The extraction of anions by the method according to the present invention may beneficially be carried out by using chemicals which are not themselves harsh to the environment and without the substantial production of secondary aqueous stream wastes.

BRIEF DESCRIPTION OF THE DRAWING

Embodiments of the present invention will now be described by way of example with reference to the accompanying drawing, in which.

DETAILED DESCRIPTION OF THE INVENTION

Figure 1:
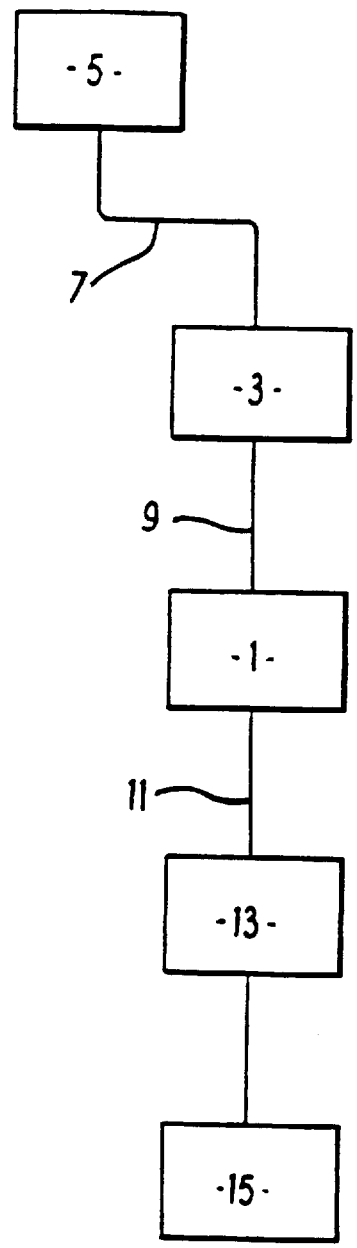
FIG. 1 is a flow chart of a supercritical fluid extraction process embodying the present invention.

As illustrated in FIG. 1 actinide-containing anion-contaminated particulate material such as sand is washed, rinsed and air dried and placed in a stainless steel container in a commercially available contactor vessel 1. A extractant comprising a mixture of a complexant tert-butyl ammonia, and an oxidising agent eg $H_2O_2$, provided in equal proportions, is formed in a high pressure extractant cylinder 3. The contactor vessel 1 and extractant cylinder 3 are placed in an oven and heated to an accurately controlled temperature of 60° C. Supercritical $CO_2$ at a pressure of 150 atmospheres is pumped from a source 5 via a fused silica tube 7 into the vessel 3 where it is mixed with the extractant, the supercritical fluid forming about 90–95 per cent by volume of the composition formed.

The supercritical fluid containing extractant solvent is passed via a further tube 9 through the particulate material in the vessel 1 and actinide-containing anions are thereby oxidised and dissolved. The solution so formed is passed via a tube 11 to an extractor 13 in which the pressure and temperature of the supercritical fluid are reduced to one atmosphere and actinide eg uranium or plutonium particles are precipitated. The actinide particles are thereafter separated eg by filtration in a separator 15 and the filtrate is encapsulated and disposed of safely in a known manner.

In a further specific embodiment the particulate material is replaced with a sample, eg a sample of biomass material, possibly containinted with fluoride ions to be analysed. The concentration of fluoride ions in the sample is to be determined. Supercritical fluid $CO_2$ is mixed with complexant as in the above described embodiment. The solvent mixture so formed is then fed into a contactor vessel where it is contacted with the sample possibly containing fluoride ions. Fluoride ions are thereby transferred to the solvent. The fluoride species is subsequently separated from the solvent in the manner described above by reduction of the $CO_2$ pressure and by filtration. The separated fluoride species may then be analysed in a known way using a fluoride sensor to determine the fluoride concentration, eg using a chromatograph.

In a further specific embodiment supercritical fluid $CO_2$ is mixed with complexant as in the above described embodiment. The solvent mixture so formed is then fed into a contactor vessel where it is contacted with a liquid sample in a countercurrent flow. The sample is to be analysed for fluoride ion concentration and fluoride ions in the sample are thereby transferred to the solvent. The fluoride is subsequently separated from the solvent and analysed in a known way using a fluoride sensor to determine its concentration, eg using a chromatograph.

We claim:

1. A method of extracting anionic species from a host medium containing said species which comprises containing the medium with an extractant solvent so as to extract said species from the host medium to the solvent, the solvent supercritical carbon dioxide and a complexant for solubilizing and extracting the ionic species present in said medium wherein the complexant comprises a positively charged ligand.

2. A method as in claim 1, wherein the extractant solvent further comprises a conditioning agent that includes at least one of an oxidizing agent and a reducing agent.

3. A method as in claim 1 wherein said host medium comprises a solid or liquid.

4. A method as in claim 1, wherein said method further comprises analyzing the concentration of the anion species in said host medium, said host medium comprising a solid or a liquid.

5. A method as in claim 1, wherein said host medium is a contaminated surface.

6. A method as in claim 1, wherein said host medium comprises soil.

7. A method as in claim 1, wherein the anionic species to be extracted comprise anions of a radioactive or non-radioactive heavy metal species.

8. A method as in claim 1, wherein the anionic species to be extracted comprise one or more of $F^-, Cl^-, Br^-, I^-, SO_4^{--}, PO_4^{---}, CrO_4^{--}, Cr_2O_7^{--}, MnO_4^-, U_2O_7^{--}, TcO_4^-$, and $V_2O_5^{--}$.

9. A method as in claim 1, wherein the extractant solvent includes the following ingredients in the following percentages:

a) supercritical carbon dioxide 99.99 to 80 per cent by volume.

10. A method as in claim 1, wherein the extractant solvent further comprises a neutral ligand.

11. A method as in claim 1, wherein the positively charged ligand of the complexant comprises an organic nitrogen compound.

12. A method as in claim 11 wherein the organic nitrogen compound comprises an aliphatic derivative of ammonia.

13. A method of extracting anionic species from a host medium containing said species which comprises contacting the medium with an extractant solvent so as to extract said species from the host medium to the solvent, the solvent comprises supercritical carbon dioxide and a complexant for solubilizing and extracting the ionic species present in said medium wherein the complexant comprises a positively charged ligand, and wherein said extractant solvent also includes a conditioning agent which comprises either an oxidizing agent or a reducing agent.

14. A method as in claim 13, wherein the extractant solvent further comprises a neutral ligand.

15. A method of extracting anionic species from a host medium containing said species which comprises contacting the medium with an extractant solvent so as to extract said species from the host medium to the solvent, the solvent comprises supercritical carbon dioxide and a complexant for solubilizing and extracting the ionic species present in said medium wherein the complexant comprises a positively charged ligand, and wherein the extractant solvent also comprises a neutral ligand.

16. A method as in claim 15, wherein the extractant solvent further comprises a conditioning agent that includes at least one of an oxidizing agent that includes at least one of an oxidizing agent and a reducing agent.

17. A method of extracting anionic species from a host medium containing such species which comprises contacting the medium with an extractant solvent so as to extract said species from the host medium to the solvent, the solvent comprises supercritical carbon dioxide and a complexant for solubilizing and extracting the ionic species present in said medium wherein the complexant comprises a positively charged ligand, and wherein the extractant solvent also comprises a neutral ligand neutral ligand comprises an organic phosphate.

18. A method as in claim 17, wherein the extractant solvent further comprises a conditioning agent that includes at least one of an oxidizing agent and a reducing agent.

* * * * *

UNITED STATES PATENT AND TRADEMARK OFFICE
CERTIFICATE OF CORRECTION

PATENT NO. : 5,834,316
DATED     : November 10, 1998
INVENTOR(S) : Smart et al.

It is certified that error appears in the above-identified patent and that said Letters Patent is hereby corrected as shown below:

On the title page, Item [73],
"Chesire" should be deleted and --Cheshire-- inserted therefor.

Signed and Sealed this

First Day of June, 1999

*Attest:*

Q. TODD DICKINSON

*Attesting Officer*    Acting Commissioner of Patents and Trademarks